United States Patent
Huang et al.

(10) Patent No.: US 9,030,697 B2
(45) Date of Patent: May 12, 2015

(54) PRINTING DEVICES AND MOBILE PRINTING SYSTEMS THEREOF

(71) Applicant: HiTi Digital, Inc., New Taipei (TW)

(72) Inventors: Chien-Hua Huang, New Taipei (TW); Mei-Ju Ko, New Taipei (TW); Jufen Huang, New Taipei (TW); Chia-chen Wei, New Taipei (TW); Hung-Chan Chien, New Taipei (TW); Hong-Shun Chiou, New Taipei (TW); Yu-Fan Fang, New Taipei (TW); Chun-Chang Tu, New Taipei (TW); Tsung-Yueh Chen, New Taipei (TW); Chih-Chieh Lin, New Taipei (TW); Yueh Cheng Lin, New Taipei (TW); Shiu-Sheng Hsu, New Taipei (TW); Chu-Ming Liu, New Taipei (TW)

(73) Assignee: HiTi Digital, Inc., New Taipei (TW)

( * ) Notice: Subject to any disclaimer, the term of this patent is extended or adjusted under 35 U.S.C. 154(b) by 0 days.

(21) Appl. No.: 13/933,132

(22) Filed: Jul. 2, 2013

(65) Prior Publication Data
US 2015/0009525 A1   Jan. 8, 2015

Related U.S. Application Data

(60) Provisional application No. 61/786,542, filed on Mar. 15, 2013, provisional application No. 61/667,952, filed on Jul. 4, 2012, provisional application No. 61/675,345, filed on Jul. 25, 2012, provisional application No. 61/697,306, filed on Sep. 6, 2012, provisional application No. 61/691,273, filed on Aug. 21, 2012.

(51) Int. Cl.
*G06F 3/12* (2006.01)

(52) U.S. Cl.
CPC ................................ *G06F 3/1292* (2013.01)

(58) Field of Classification Search
USPC ........................................... 358/1.15
See application file for complete search history.

(56) References Cited

U.S. PATENT DOCUMENTS

| | | | |
|---|---|---|---|
| 2004/0009022 A1* | 1/2004 | Matsunaga et al. | 400/61 |
| 2008/0009309 A1* | 1/2008 | Gha | 455/550.1 |
| 2008/0049253 A1* | 2/2008 | Chang et al. | 358/1.15 |

OTHER PUBLICATIONS

Canon Photo Printer SELPHY CP900 http://www.usa.canon.com/cusa/consumer/products/printers_multifunction/compact_photo_printers/selphy_cp900, Date Dec. 16, 2014.

\* cited by examiner

*Primary Examiner* — Ngon Nguyen
(74) *Attorney, Agent, or Firm* — CKC & Partners Co., Ltd.

(57) ABSTRACT

The present invention discloses a printing device. The printing device of the present invention may include a communication element capable of communicating with an external host utilizing a plurality of telecommunication network technologies to receive a file sent from the external host to the device, a printing element electrically coupled to the communication element to output an image file, and an audio outputting element electrically coupled to the communication element to output an audio file, wherein the communication element identifies a file type of the file received from the external host and selectively sends the file to the printing element or the audio outputting element.

9 Claims, 3 Drawing Sheets

PRINTING DEVICES AND MOBILE PRINTING SYSTEMS THEREOF

CROSS-REFERENCE TO RELATED APPLICATIONS

This application is related to and claims priority to U.S. provisional patent application, U.S. Provisional Application No. 61/667,952 filed on Jul. 4, 2012, by the applicant Chih-Chieh Lin, entitled "Image output device and related mobile communication device of utilizing mobile communication technology to transmit an image and a control command," U.S. provisional patent application, U.S. Provisional Application No. 61/675,345 filed on Jul. 25, 2012, by the applicants Shiu-Sheng Hsu et al., entitled "Image output device with receiving and transmitting functions," U.S. provisional patent application, U.S. Provisional Application No. 61/697,306 filed on Sep. 6, 2012, by the applicant Chu-Ming Liu, entitled "Image printing device capable of outputting an audio signal," U.S. provisional patent application, U.S. Provisional Application No. 61/691,273 filed on Aug. 21, 2012, by the applicant Yu-Fan Fang, entitled "Print device," and U.S. provisional patent application, U.S. Provisional Application No. 61/786,542 filed on Mar. 15, 2013, by the applicants Chien-Hua Huang et al., entitled "Printing devices, detachable flipper module thereof and applications thereof."

FIELD OF THE INVENTION

The present invention relates to printing devices and mobile printing systems thereof; more particularly, the present invention relates to printing devices capable of selectively outputting an image file and an audio file without adding the processing power of the existing device; more particularly, the present invention relates to mobile printing systems where the first mobile device may be controlled by the second mobile device so that a majority of the processing required to output a file by the first mobile device may be performed at the second mobile device thereby minimizing the processing power needed at the first mobile device.

BACKGROUND OF THE INVENTION

Traditional printing devices usually have a designated controller electrically coupled to an internal memory so as to retrieve related parameters for processing when a print instruction is received. As the demands for real-time printing and printing quality have increased dramatically, the controller equipped in the traditional printing devices requires faster and more sophisticated processing capability to complete its tasks. However, such demands for more processing power inevitably increase the manufacturing cost and the size of the printing devices. These drawbacks, unfortunately, do not appeal to today's consumers in the more and more competitive printer market. Today's consumers are attracted to cheaper, smaller printers with a variety of interesting and useful functions to offer.

Therefore, what is needed is a printing device that can process real-time, complicated tasks without adding additional elements to the existing device. Additionally, what is needed is a printing device that can offer more functions, such as a printing device that can be used as a music player, to satisfy the demands of today's consumers.

SUMMARY OF THE INVENTION

In light of the drawbacks of the above prior arts, one object of the present invent on is to provide a printing device with a communication element that communicates with an external host in such a way that a majority of processing of a file received by the printing device is controlled by the external host thereby minimizing the processing power needed by the printing device.

In accordance with the present invention, the printing device may include a communication element capable of communicating with an external host utilizing a plurality of telecommunication network technologies to receive a file sent from the external host to the device, a printing element electrically coupled to the communication element to output an image file, and an audio outputting element electrically coupled to the communication element to output an audio file, wherein the communication element identifies a file type of the file received from the external host and selectively sends the file to the printing element or the audio outputting element.

Another object of the present invention is to provide a mobile device used in connection with a printing device to take control of a majority of processing required to output a file received by the printing device so as to minimize the processing power needed by the printing device.

In accordance with the present invention, the mobile device used in connection with a printing device may include a computer readable medium storing computer program instructions to be sent to the printing device to establish a control of the printing device, a transceiver transmitting the instructions to the printing device utilizing one of a plurality of telecommunication network technologies, a processor electrically coupled to the computer readable medium and the transceiver to process a majority of tasks for the printing device once the control is established, and a user interface displaying a selection of options for a user to operate the printing device.

Yet another object of the present invention is to provide a mobile printing system where a first mobile device may be controlled by a second mobile device in such a way that a majority of processing required to output a file received by the first mobile device is performed by the second mobile device so as to minimize the processing power needed by the first mobile device.

In accordance with the present invention, the mobile printing system may include a first mobile device having a communication element capable of communicating with a second mobile device utilizing a plurality of telecommunication network technologies to receive a file sent from the second mobile device to the first mobile device. The first mobile device may have an outputting element to output the file. The second mobile device may have a computer readable medium to store computer program instructions to control a majority of processing required to output the file, wherein the outputting element includes a printing element and an audio outputting element. The printing element is electrically coupled to the communication element to output an image file, whereas the audio outputting element is electrically coupled to the communication element to output an audio file, and wherein the communication element identifies a file type of the file sent from the second mobile device and selectively sends the file to the printing element or the audio outputting element.

Certain embodiments of the invention have other aspects in addition to or in place of those mentioned above. The aspects will become apparent to those skilled in the art from reading of the following detailed description when taken with reference to the accompanying drawings.

DETAILED DESCRIPTION OF THE INVENTION

The following embodiments are described in sufficient detail to enable those skilled in the art to make and use the invention. It is to be understood that other embodiments would be evident based on the present disclosure, and that changes may be made without departing from the scope of the present invention.

The present invention provides a printing device. In particular, the present invention provides a printing device capable of selectively outputting an image file or an audio file without adding the processing power of the existing device. In accordance with the present invention, the printing device may have a communication element capable of communicating with an external host in such a way that a majority of the processing required to output a file by the printing device can be performed at the external host. As a result, the processing power needed by the printing device can be minimized.

In one embodiment of the present invention, the present invention may utilize the $3^{rd}$ generation of mobile telecommunications technology (3G). However, those skilled in the art should know that the present invention is not limited to the 3G technology. Instead, any other known communication network technologies, such as 2G, 4G, 4G LTE, Wi-Fi, Bluetooth, infrared (IR), Ethernet, etc., may be utilized in the present invention.

Figure 1:
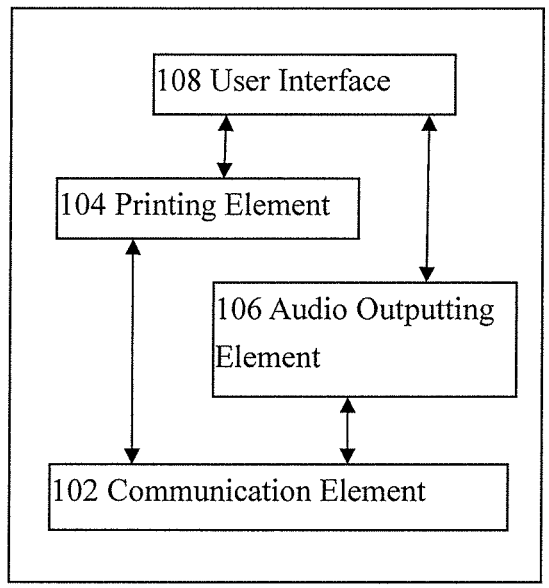
FIG. 1 is a schematic view of a printing device in accordance with one embodiment of the present invention.
Figure 1:
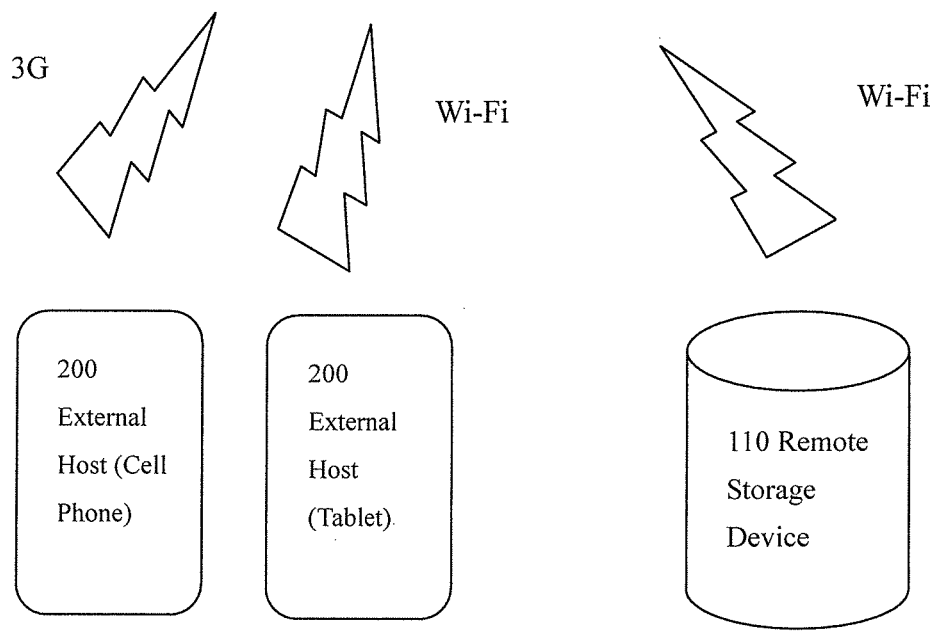

Refer to FIG. 1, which illustrates a schematic view of a printing device in accordance with one embodiment of the present invention. As shown in FIG. 1, in one embodiment of the present invention, the printing device 100 may include a communication element 102. In one embodiment of the present invention, the communication element 102 may be implemented within the printing device 100 as hardware, software, firmware or any combination thereof. As such, the printing device 100 of the present invention is equipped with built-in telecommunication capability. In another embodiment of the present invention, the communication element 102 may be externally connected to the printing device 100, such as via a USB plug. As such, even if the printing device 100 may not be equipped with built-in telecommunication capability, the communication element 102 may be added later on to provide such function. In one embodiment of the present invention, the communication element 102 may be implemented as a circuit, an application program, a communication protocol, or any combination thereof. However, it should be noted that the communication element 102 of the present invention is not limited to such implementation.

In accordance with the present invention, the communication element 102 of the present invention may communicate with an external host, such as external host 200, utilizing a plurality of communication network technologies, such as 2G, 3G, 4G, 4G LTE, Wi-Fi, Bluetooth, infrared, Ethernet mentioned above. In one embodiment of the present invention, the external host 200 may be implemented as a mobile device, such as a cell phone, a laptop, a tablet, a digital camera, or any similar device known to those skilled in the art utilizing wireless network technologies, such as 3G or Wi-Fi to communicate with the communication element 102. In another embodiment of the present invention, the external host 200 may be implemented as a wired device, such as a desktop, zing the wired Ethernet connection to communicate with the communication element 102. In accordance with the present invention, the external host 200 may upload and download data in high speed utilizing the wireless or wired connection.

In one embodiment of the present invention, the external host 200 may initiate a signal to establish a communication connection with the communication element 102. The communication element 102 may in turn process the signal, acknowledge the initiation, and respond to the external host 200 by confirming the communication connection has been established. The communication element 102 may provide a current status of a particular element within the printing device 100, such as a printing element 106 and an audio outputting element 108, which will be described in details later, to the external host 200 so that the external host 200 may determine whether to send a file to the printing device 100 immediately. Then, the printing device 100 is ready to receive any file the external host 200 is about to send under a peer-to-peer (P2P) structure.

In another embodiment of the present invention, the printing device 100 may communicate with more than one external host utilizing more than one of the plurality of telecommunication network technologies mentioned above. For example, the external host 200 may include a cell phone and a tablet. In such an example, the printing device 100 may communicate with the cell phone using the 3G network. On the other hand, the printing device 100 may communicate with the tablet using Wi-Fi. As such, the printing device 100 may establish a communication connection with the cell phone and the tablet, respectively, so as to output the files received from the cell phone and/or the tablet under a one-to-many network infrastructure.

In accordance with the present invention, the communication element 102 may identify a file type of the file sent from the external host 200. In one example, the external, host 200 may send an image file, such as a picture, to the printing device 100. In another example, the external host 200 may send an audio file, such as a music file, to the printing device 100. As such, the communication element 102 of the present invention may identify the file type of the file received from the external host 200, send the file to the corresponding element, and activate the corresponding element to output the file accordingly.

In one embodiment of the present invention, the printing device 100 may include a printing element 104 and an audio outputting element 106. The printing element 104 of the present invention may be electrically coupled to the communication element 102 to output an image file. Additionally, the audio outputting element 106 of the present invention may be electrically coupled to the communication element 102 to output an audio file. As such, when the external host 200 sends an audio file, such as a music file, to the printing device 100, the communication element 102 of the present invention may recognize the file received is a music file, selectively send the music file to the audio outputting element 106, and activate the audio outputting element 106. The audio outputting element 106 may then play the music file.

In another example, the external host 200 may send an image file, such as a picture file, to the printing device 100. The communication element 102 of the present invention may recognize the file received is an image file, selectively send the image file to the printing element 104, and activate the printing element 104. The printing element 104 may then print out the picture. In other words, the communication element 102 of the present invention is equipped with the capability to identify the file type of the file as soon as it is received from the external host 200. As such, less processing is required at the backend when the file is outputted. Additionally, because the communication element 102 of the present invention is equipped with the capability to distinguish between an image file and an audio file, the printing device 100 may be used as a music player to play music files through the audio outputting element 106 without adding more elements or processing requirements to the existing device.

In one embodiment of the present invention, the audio outputting element 106 may be built within the printing device 100, such as an internal speaker. In another embodiment of the present invention, the audio outputting element 106 may be connected to the printing device 100 externally. That is, the audio outputting element 108 may be a separate structure, such as an external speaker, electrically connected to the printing device 100 via a wire to output music files. In one embodiment of the present invention, the external speaker may share the same power source as the printing element 104. In another embodiment of the present invention, the external speaker may have a designated power source.

In accordance with the present invention, the audio outputting element 108 may not only play music files sent from the mobile device 200 individually, but also output a reminder sound after the printing element 104 finishes a print job to remind the user that a picture or a print job is ready for pickup.

In one embodiment of the present invention, the printing device 100 may include a user interface 108. In one embodiment of the present invention, the user interface 108 may be built within the printing device 100 as a screen on a top or side surface of the printing device 100. In another embodiment of the present invention, the user interface 108 may be externally connected to the printing device 100. The user interface 108 of the present invention may provide a screen to display a selection of options for a user to operate the printing device 100, such as to change the print size, the number of prints, etc. The user interface 108 of the present invention may also select a data transmission option to request a file be sent from a remote storage device or to download a file from the remote storage device.

In one embodiment of the present invention, a remote storage device 110 may be provided to store files received from the external host 200. In another embodiment of the present invention, the printing element 100 may retrieve the files from the remote storage device 110 and then output the file. For example, the printing device 100 may retrieve a music file from the remote storage device 110 and play the music file from the audio outputting element 106 accordingly. Or, the printing device 100 may retrieve an image file from the remote storage device 110 and print out the image file from the printing element 104 accordingly. As such, the printing device 100 does not require a local storage medium to store large amount of images and/or audio files, keeping the size of the printing device as compact as possible.

In one embodiment of the present invention, the remote storage device 110 may communicate with the printing device 100 via a wireless Internet connection. However, it should be understood by those skilled in the art that the remote storage device 110 may also communicate with the printing device 100 via other known communication method, such as 2G, 3G, 4G, 4G LTE, Wi-Fi, Bluetooth, infrared (IR), or Ethernet.

Figure 2:
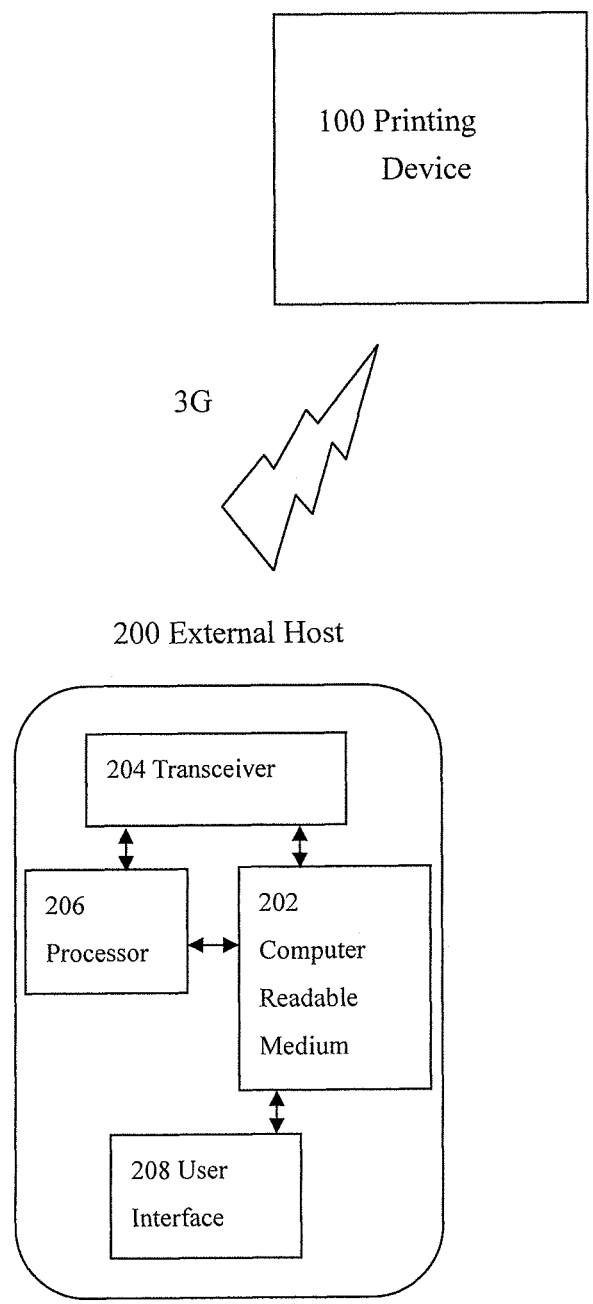
FIG. 2 is a schematic view of a mobile device used in connection with a printing device in accordance with one embodiment of the present invention.

Refer now to FIG. 2, which illustrates a schematic view of a mobile device used in connection with the printing device in accordance with one embodiment of the present invention. As shown in FIG. 2, the mobile device present invention may include a computer readable medium 202 to store computer program instructions to control a majority of the processing required to output a file at the printing device 100, such as an image file and/or an audio file.

In one embodiment of the present invention, the computer readable medium 202 may be, for example but not limited to any physically tangible device that operates using magnetic, electronic, electromagnetic, optical, or semiconductor components. In particularly, the computer readable medium 202 may be a memory card, a hard disk, a portable computer diskette, a random access memory, a read-only memory (ROM), or any other physically tangible medium that can contain, store, communicate, or transport a program for use by or in connection with the mobile device 200.

In accordance with the present invention, the computer readable medium 202 may store computer program instructions to be sent to the printing device 100 to establish control of the printing device 100. In one embodiment of the present invention, the computer program instructions stored in the computer readable medium 202 may initiate a signal to establish communication connection with the printing device 100. After the communication connection is established, the mobile device 200 may receive the current status of the printing element 104 and the audio outputting element 106 as mentioned previously and begin taking control of the printing device 100.

In one embodiment of the present invention, the mobile device 200 may include a processor 206. The processor 206 of the present invention may process the tasks originally to be performed by the printing device 100. In one embodiment of the present invention, the processor 206 may be electrically coupled to the computer readable medium 202 and the transceiver 204 so that once the parameters of the printing element 104 and the audio outputting element 106 are received, the processor 206 may perform the necessary calculation and generate control instructions to be sent to the printing device 100.

In one embodiment of the present invention, the processor 206 may immediately send an instruction to the printing device 100 to print an image file because based on the parameters received from the printing element 104, the printing element 104 is idle. In another embodiment of the present invention, the processor 206 may send an instruction to the printing device to halt a print job because based on the parameters received from the printing element 104, the printing element 104 is busy.

In one embodiment of the present invention, the mobile device 200 may wish to send an image file to the printing device 100. In accordance with the present invention, before a user sends the image file to the printing device 100, the user may first edit the image file from the mobile device 200. For example, the user may wish to add a photo frame, such as a gold or silver color frame, to the image file. In another example, the user may wish to adjust the color saturation of the image file. In accordance with the present invention, the computer readable medium 202 may store computer program instructions to perform such editing at the mobile device 200. As a result, the edited image file may be processed by the processor 206 of the mobile device 200 instead of the printing device 100. When the edited image file is sent to the printing device 100, the communication element 102 of the printing device 100 may simply send the edited image file to the printing element 104 and activate the printing element 104 to output the edited image file.

In another embodiment of the present invention, the mobile device 200 may also send music files to the printing device 100. In such an example, the computer readable medium 202 may store computer program instructions to be sent to the printing device 100 to establish the communication connection. As the communication connection is established, the computer program instructions may send one selected music file or a number of selected music files from its local memory to the printing device 100. In one example, the computer program instructions may randomly send a music file from a local playlist to the printing device 100. When receiving the music files from the mobile device 200, the communication element 102 of the present invention may directly send the file to the audio outputting element 106 and activate the audio outputting element 106 to play the music files. As such, the printing device 100 may be used as a music player without storing the music files locally.

In one embodiment of the present invention, the mobile device 200 may include a transceiver 204. In accordance with the present invention, the computer readable medium 202 is electrically coupled to the transceiver 204 such that the computer program instructions stored in the computer readable medium 202 may be sent to the communication element 102 of the printing device 100. Additionally, the music and/or image files stored in the computer readable medium 202 may also be sent to the communication element 102 of the printing device 100.

In one embodiment of the present invention, the mobile device 200 may include a user interface 208. The user interface 208 of the present invention may display a selection of options for a user to operate the mobile device 200. Additionally, the user interface 208 of the present invention may display a selection of options for the user to operate the printing device 100 once a communication connection is established between the printing device 100 and the mobile device 200. For example, if a user wishes to edit a picture file before printing it out, the user may select a desired photo frame, such as a gold or silver color frame, or change the color saturation of the picture at the mobile device end through the user interface 208. Additionally, the user may also select the printing options, such as picture size, resolution, the number of prints, etc. at the mobile device end through the user interface 208. In other words, once the communication connection is established between the printing device 100 and the mobile device 200, the user interface 208 of the mobile device 200 may display the user menu shown in the user interface 108 of the printing device 100. As such, the mobile device 200 may take control of the printing device 100.

Figure 3:
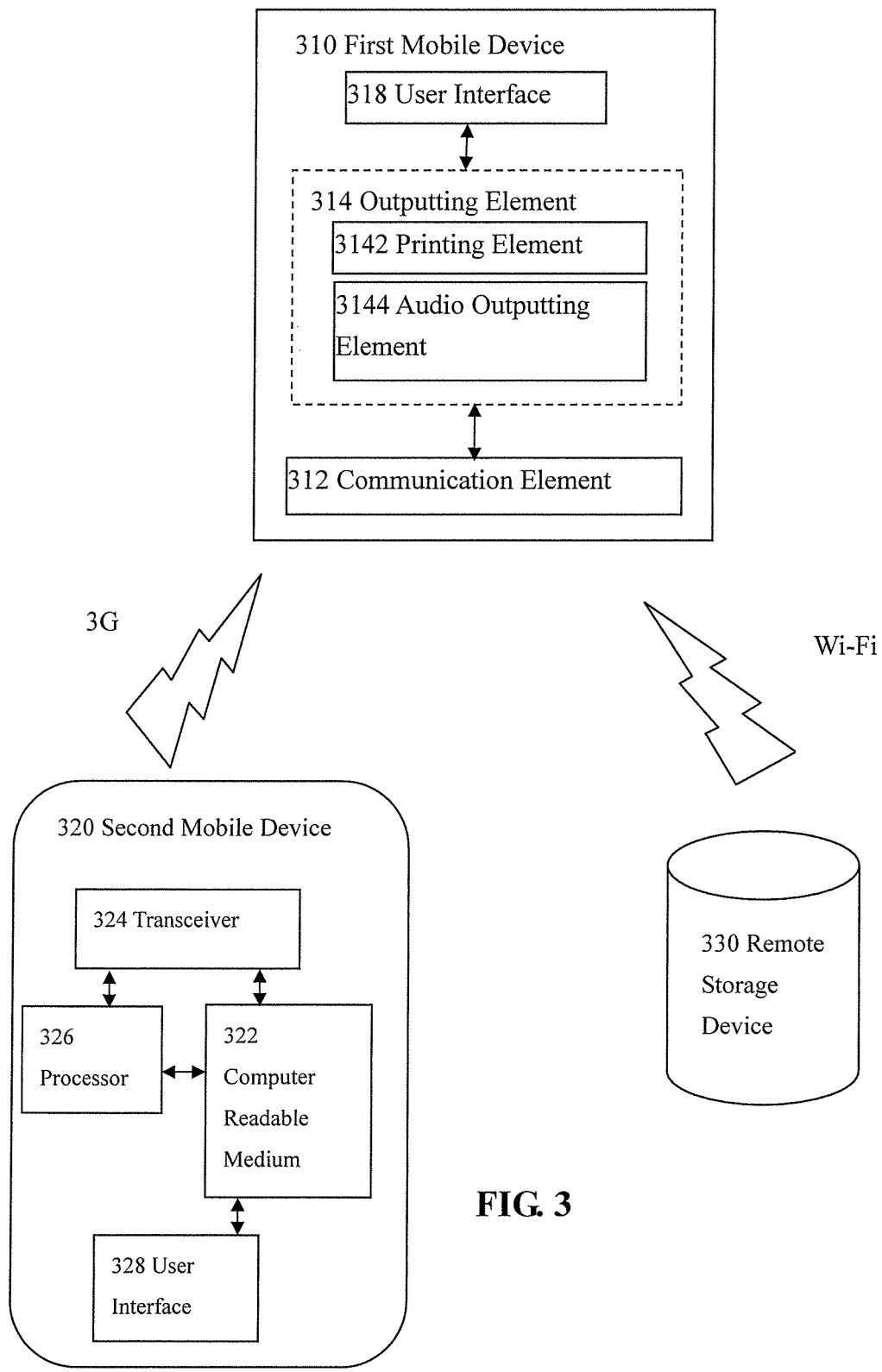
FIG. 3 is a schematic view of a mobile printing system in accordance with one embodiment of the present invention.

Refer now to FIG. 3, which illustrates a schematic view of a mobile printing system in accordance with one embodiment of the present invention. As shown in FIG. 3, the mobile printing system 300 may include a first mobile device 310 and a second mobile device 320. In one embodiment of the present invention, the first mobile device 310 may be a pocket printer.

In accordance with the present invention, the first mobile device 310 may include a communication element 312. The communication element 312 of the present invention may communicate with the second mobile device 320 utilizing plurality of telecommunication network technologies. In one embodiment of the present invention, the present method may utilize the 3 generation of mobile telecommunications technology (3G). However, those skilled in the art should know that the present invention is not limited to the 3G technology. Instead, any other known communication network technologies, such as 2G, 4G, 4G LTE, Wi-Fi, Bluetooth, infrared (IR), Ethernet, etc., may be utilized in the present invention.

For example, the communication element 312 may communicate with the second mobile device 320 via a 3G wireless network. In such an example, the second mobile device 320, such as, a cell phone, a desktop, a laptop, a tablet, digital camera, or any similar device known to those skilled in the art, may send a signal to the communication element 312 so as to initiate a communication connection. The communication element 312 may in turn process the signal, acknowledge the initiation, and respond to the second mobile device 320 by confirming the communication connection been established. The communication element 312 may provide a current status of a particular element within the first mobile device 310, such as a printing element 3142 and an audio outputting element 3144, which will be described in details later, to the second mobile device 320 so that the second mobile device 320 may determine whether to send a file to the first mobile device 310 immediately. Then, the first mobile device 310 is ready to receive any file the second mobile device 320 is about to send under a peer-to-peer (P2P) structure.

In another embodiment of the present invention, the first mobile device 310 may communicate with more than one second mobile device utilizing more than one of the plurality of telecommunication network technologies mentioned above. For example, the second mobile device 320 may include a cell phone and a tablet. In such an example, the first mobile device 310 may communicate with the cell phone using the 3G network. On the other hand, the first mobile device 310 may communicate with the tablet using Wi-Fi. As such, the first mobile device 310 may establish a communication connection with the cell phone and the tablet, respectively, so as to output the files received from the cell phone and/or the tablet under a one-to-many network infrastructure.

In accordance with the present invention, the communication element 312 may identify a file type of the file sent from the second mobile device 320. In one example, the second mobile device 320 may send an image file, such as a picture, to the first mobile device 310. In another example, the second mobile device 320 may send an audio file, such as a music file, to the first mobile device 310. As such, the communication element 312 of the present invention may identify the file type received from the second mobile device 320 and send the file to an outputting element 314.

In one embodiment of the present invention, the outputting element 314 may include a printing element 3142 and an audio outputting element 3144. The printing element 3142 of the present invention may be electrically coupled to the communication element 312 to output an image file. Additionally, the audio outputting element 3144 of the present invention may be electrically coupled to the communication element 102 to output an audio file. As such, when the second mobile device 320 sends an audio file, such as a music file, to the first mobile device 310, the communication element 312 of the present invention may recognize the file received is a music file, selectively send the music file to the audio outputting element 3144, and activate the audio outputting element 3144. The audio outputting element 3144 may then play the music file.

In another example, the second mobile device 320 may send an image file, such as a picture file, to the first mobile device 310. The communication element 312 of the present invention may recognize the file received is an image file, selectively send the image file to the printing element 3142, and activate the printing element 3142. The printing element 3142 may then print out the picture. In other words, the communication element 312 of the present invention is equipped with the capability to identify the file type of the file as soon as it is received from the second mobile device 320. As such, less processing is required at the backend when the file is outputted. Additionally, because the communication element 312 of the present invention is equipped with the capability to distinguish between an image file and an audio file, the first mobile device 310 may be used as a music player to play music files through the audio outputting element 3144 without adding more elements or processing requirements to the existing device.

In one embodiment of the present invention, the audio outputting element 3144 may be built within the first mobile device 310, such as an internal speaker. In another embodiment of the present invention, the audio outputting element 3144 may be connected to the first mobile device 310 externally. That is, the audio outputting element 3144 may be a separate structure, such as an external speaker, electrically connected to the first mobile device 310 via a wire to output music files. In one embodiment of the present invention, the external speaker may share the same power source as the printing element 3142. In another embodiment of the present invention, the external speaker may have a designated power source.

In accordance with the present invention, the audio outputting element 3144 may not only play music files sent from the second mobile device 320 individually, but also output a reminder sound after the printing element 3142 finishes a print job to remind the user that a picture or a print job is ready for pickup.

In one embodiment of the present invention, the first mobile device 310 may include a user interface 318. In one embodiment of the present invention, the user interface 318 may be built within the first mobile device 310 as a screen on a top or side surface of the first mobile device 310. In another embodiment of the present invention, the user interface 318 may be externally connected to the first mobile device 310. The user interface 318 of the present invention may provide a screen to display a selection of options a user to operate the first mobile device 310, such as to change the print size, the number of prints, etc. The user interface 318 of the present invention may also select a data transmission option to request a file be sent from a remote storage device or to download a file from the remote storage device.

In one embodiment of the present invention, a remote storage device 330 may be provided to store files received from the second mobile device 320. In another embodiment of the present invention, the printing element 3142 may retrieve the files from the remote storage device 330 and then output the file. For example, the first mobile device 310 may retrieve a music file from the remote storage device 330 and play the music file from the audio outputting element 3144 accordingly. Or, the first mobile device 310 may retrieve an image file from the remote storage device 330 and print out the image file from the printing element 3142 accordingly. As such, the first mobile device 310 does not require a local storage medium to store large amount of images and/or audio files keeping the size of the printing device as compact as possible.

In one embodiment of the present invention, the remote storage device 330 may communicate with the first mobile device 310 via a wireless Internet connection. However, it should be understood by those skilled in the art that the remote storage device 330 may also communicate with the first mobile device 310 via any other known communication method, such as 2G, 3G, 4G, 4G LTE, Wi-Fi, Bluetooth, or infrared (IR).

In accordance with the present invention, the second mobile device 320 of the present invention may include a computer readable medium 322 to store computer program instructions to control a majority of the processing required to output a file at the first mobile device 310, such as an image file and/or an audio file.

In one embodiment of the present invention, the computer readable medium 322 may be, for example but not limited to any physically tangible device that operates using magnetic, electronic, electromagnetic, optical, or semiconductor components. In particularly, the computer readable medium 322 may be a memory card, a hard disk, a portable computer diskette, a random access memory, a read-only memory (ROM), or any other physically tangible medium that can contain, store, communicate, or transport a program for use by or in connection with the second mobile device 320.

In accordance with the present invention, the computer readable medium 322 may store computer program instructions to be sent to the first mobile device 310 to establish control of the first mobile device 310. In one embodiment of the present invention, the computer program instructions stored in the computer readable medium 322 may initiate a signal to establish a communication connection with the first mobile device 310. After the communication connection is established, the second mobile device 320 may receive the current status of the printing element 3142 and the audio outputting element 3144 as mentioned previously and begin taking control of the first mobile device 310.

In one embodiment of the present invention, the second mobile device 320 may include a processor 326. The processor 326 of the present invention may process the tasks originally to be performed by the first mobile device 310. In one embodiment of the present invention, the processor 326 may be electrically coupled to the computer readable medium 322 and the transceiver 324 so that once the parameters of the printing element 3142 and the audio outputting element 3144 are received, the processor 326 may perform the necessary calculation and generate control, instructions to be sent to the fi mobile device 300.

In one embodiment of the present invention, the processor 326 may immediately send an instruction to the first mobile device 310 to print an image file because based on the parameters received from the printing element 3142, the printing element 3142 is idle. In another embodiment of the present invention, the processor 326 may send an instruction to the printing device to halt a print job because based on the parameters received from the printing element 3142, the printing element 3142 is busy.

In one embodiment of the present invention, the second mobile device 320 may wish to send an image file to the first mobile device 310. In accordance with the present invention, before a user sends the image file to the first mobile device 310, the user may first edit the image file from the second mobile device 320. For example, the user may wish to add a photo frame, such as a gold or silver color frame, to the image file. In another example, the user may wish to adjust the color saturation of the image file. In accordance with the present invention, the computer readable medium 322 may store computer program instructions to perform such editing at the second mobile device 320. As a result, the edited image file may be processed by the processor 326 of the second mobile device 320 instead of the first mobile device 310. When the edited image file is sent to the first mobile device 310, the communication element 312 of the first mobile device 310 may simply send the edited image file to the printing element 3142 and activate the printing element 3142 to output the edited image file.

In another embodiment of the present invention, the second mobile device 320 may also send music files to the first mobile device 310. In such an example, the computer readable medium 322 may store computer program instructions to be sent to the first mobile device 310 to establish the communication connection. As the communication connection is established, the computer program instructions may send one selected music file or a number of selected music files from its local memory to the first mobile device 310. In one example, the computer program instructions may randomly send a music file from a local playlist to the first mobile device 310. When receiving the music files from the second mobile device 320, the communication element 312 of the present invention may directly send the file to the audio outputting element 3144 and activate the audio outputting element 3144 to play the music files. As such, the first mobile device 310 may be used as a music player without storing the music files locally.

In one embodiment of the present invention, the second mobile device 320 may include a transceiver 324. In accordance with the present invention, the computer readable medium 322 is electrically coupled to the transceiver 324 such that the computer program instructions stored in the computer medium 322 may be sent to the communication element 312 of the first mobile device 310. Additionally, the music and/or image files stored in the computer readable medium 322 may also be sent to the communication element 312 of the first mobile device 310.

In one embodiment of the present invention, the second mobile device 320 may include a user interface 328. The user interface 328 of the present invention may display a selection of options for a user to operate the second mobile device 320. Additionally, the user interface 328 of the present invention may display a selection of options for the user to operate the first mobile device 310 once a communication connection is established between the first and second devices 310, 320. For example, if a user wishes to edit a picture file before printing it out, the user may select a desired photo frame, such as a gold or silver color frame, or change the color saturation of the picture at the second mobile device end through the user interface 328. Additionally, the user may also select the printing options, such as picture size, the number of copies to print out, etc. at the second mobile device end through the user interface 328. In other words, once the communication connection is established between the first and second mobile devices 310, 320, the user interface 328 of the second mobile device 320 may display the user menu shown in the user interface 318 of the first mobile device 310. As such, the second mobile device 320 may take control of the first mobile device 310.

While the invent on has been described in conjunction with exemplary preferred embodiments, it is to be understood that many alternatives, modifications, and variations will be apparent to those skilled in the art in light of the foregoing description. Accordingly, it is intended to embrace all such alternatives, modifications, and variations that fall within the scope of the included claims. The scope of the claims, therefore, should be accorded the broadest interpretation so as to encompass all such modifications and similar arrangements. All matters set forth herein or shown in the accompanying drawings are to be interpreted in an illustrative and non-limiting sense.

What is claimed is:

1. A printing device, said device comprising:
   a communication element capable of communicating with an external host utilizing a plurality of telecommunication network technologies to receive a file sent from said external host to said device;
   a printing element electrically coupled to said communication element to output an image file; and
   an audio outputting element electrically coupled to said communication element to output an audio file,
   wherein said communication element is free of a processor, and said communication element identifies whether a file type of said file received from said external host is an image file or an audio file, and selectively sends said file to said printing element if said file type of said file is said image file or sends said file to said audio outputting element if said file type of said file is said audio file.

2. The device of claim 1, wherein said plurality of telecommunication network technologies include at least 2G, 3G, 4G, 4G LTE, Wi-Fi, Bluetooth, infrared (IR), or Ethernet.

3. The device of claim 1, wherein said external host is a cell phone, a desktop, a laptop, a tablet, a digital camera, or a similar device.

4. The device of claim 1, further comprising a user interface allowing a user to operate said device.

5. The device of claim 1, wherein said communication element processes a signal sent from said external host to establish a communication connection with said external host.

6. The device of claim 1, further comprising a remote storage device to store files received from said external host.

7. The device of claim 6, wherein said device communicates with said remote storage device utilizing one of said plurality of telecommunication network technologies.

8. The device of claim 1, wherein said external host includes a computer readable medium storing computer program instructions to control a majority of processing required to output said file.

9. The device of claim 1, wherein said communication element communicates with more than one of said external host utilizing more than one of said plurality of telecommunication network technologies.

\* \* \* \* \*